(12) United States Patent
Kilgenstein et al.

(10) Patent No.: US 10,759,604 B2
(45) Date of Patent: Sep. 1, 2020

(54) DEVICE FOR GUIDING AND PIVOTING BODIES

(71) Applicant: KRONES AG, Neutraubling (DE)

(72) Inventors: Torsten Kilgenstein, Neumarkt (DE); Matthias Meier, Saal (DE); Johann Huettner, Mallersdorf-Pfaffenberg (DE); Rudolf Fiegler, Regensburg (DE); Reinhard Ortner, Pfakofen (DE); Ulrich Seidel, Voelling (DE); Hendrik Gadomski, Obertraubling (DE)

(73) Assignee: Krones AG, Neutraubling (DE)

( * ) Notice: Subject to any disclaimer, the term of this patent is extended or adjusted under 35 U.S.C. 154(b) by 0 days.

(21) Appl. No.: 16/069,768

(22) PCT Filed: Dec. 8, 2016

(86) PCT No.: PCT/EP2016/080202
§ 371 (c)(1),
(2) Date: Oct. 19, 2018

(87) PCT Pub. No.: WO2017/125201
PCT Pub. Date: Jul. 27, 2017

(65) Prior Publication Data
US 2019/0047789 A1 Feb. 14, 2019

(30) Foreign Application Priority Data
Jan. 22, 2016 (DE) .................. 10 2016 200 908

(51) Int. Cl.
*B65G 47/24* (2006.01)
*B65G 47/00* (2006.01)
(Continued)

(52) U.S. Cl.
CPC ........ *B65G 11/063* (2013.01); *B29C 49/4205* (2013.01); *B65G 47/248* (2013.01)

(58) Field of Classification Search
None
See application file for complete search history.

(56) References Cited

U.S. PATENT DOCUMENTS 3,785,473 A * 1/1974 Cook .................. B65G 47/248
                                                        198/402
4,343,575 A   8/1982 Kimball
(Continued)

FOREIGN PATENT DOCUMENTS

DE    20 2008 002349 U1    4/2008
DE    20 2011 005 686 U1   9/2011
(Continued)

OTHER PUBLICATIONS

International Search Report dated Jul. 27, 2017 on PCT/EP2016/080202.

*Primary Examiner* — Kavel Singh
(74) *Attorney, Agent, or Firm* — Lowenstein Sandler LLP

(57) ABSTRACT

The present disclosure relates to a device for guiding and pivoting bodies via sliding the bodies through the device. The device is produced using a generative manufacturing method. A system includes at least two of the devices arranged in parallel, a conveyor device, and a control device. The control device controls the conveyor device responsive to receiving a control command and feeds bodies selectively to one of the devices. A treatment line for polyethylene terephthalate (PET) containers includes a process path, a preform storage unit, a preform oven of a stretch blow-molding machine, and the device arranged between the preform storage unit and the preform oven. A treatment line for PET containers includes a process path, a container closure storage unit, a closing unit for closing the PET (Continued)

containers, and the device arranged between the container closure storage unit and the closing unit.

20 Claims, 9 Drawing Sheets

(51) Int. Cl.
*B65G 11/06* (2006.01)
*B29C 49/42* (2006.01)
*B65G 47/248* (2006.01)

(56) References Cited

U.S. PATENT DOCUMENTS

| | | |
|---|---|---|
| 4,479,574 A | 10/1984 | Julius |
| 4,492,299 A | 1/1985 | McLeod |
| 5,609,237 A | 3/1997 | Lenhart |
| 7,032,737 B2 * | 4/2006 | Egger ............... B65G 15/14 134/127 |
| 7,036,654 B2 * | 5/2006 | Frost ............... B65G 47/248 198/406 |
| 8,657,099 B2 | 2/2014 | Bianchini |
| 9,254,968 B2 * | 2/2016 | Garner ............... B65G 21/2036 |
| 9,517,895 B2 * | 12/2016 | Bacalia ............... B25J 9/0084 |
| 2012/0308837 A1 * | 12/2012 | Schlechtriemen ............... C04B 35/63424 428/446 |

FOREIGN PATENT DOCUMENTS

| | | |
|---|---|---|
| DE | 20 2013 007104 U1 | 9/2013 |
| EP | 0 070 195 A2 | 1/1983 |
| FR | 2 930 241 A1 | 10/2009 |
| GB | 1 296 189 A1 | 11/1972 |

* cited by examiner

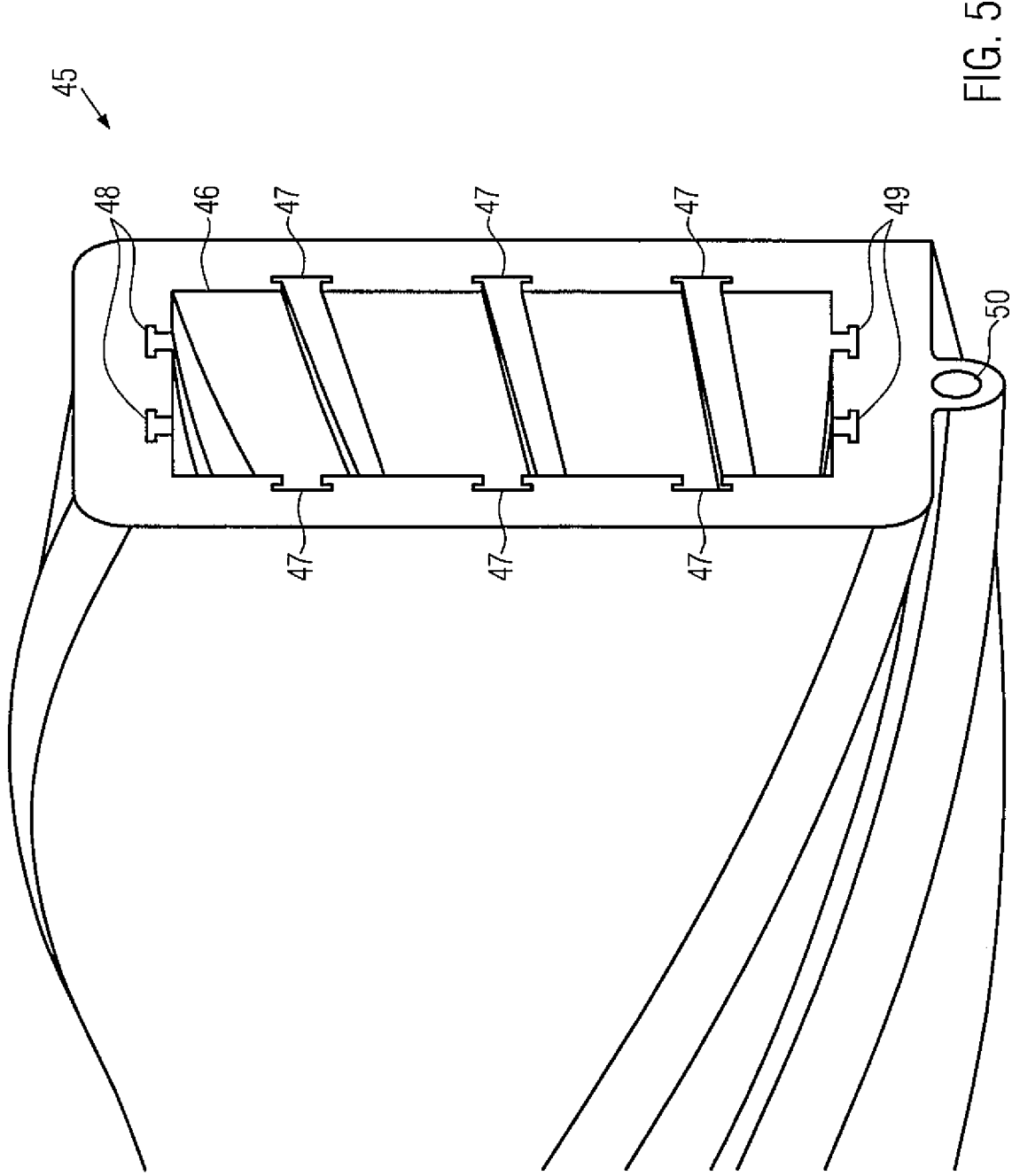

DEVICE FOR GUIDING AND PIVOTING BODIES

RELATED APPLICATIONS

This application claims the benefit under 35 U.S.C. § 371 of International Patent Application No. PCT/EP2016/080202, filed Dec. 8, 2016, which claims the benefit of German Patent Application No. 102016200908.7, filed Jan. 22, 2016, which are incorporated by reference in their entirety.

TECHNICAL FIELD

The present disclosure relates to guiding and pivoting bodies, such as cans, bottles, preforms, bottle closures, cardboard containers or flasks, about an axis parallel to a conveying direction of the bodies.

BACKGROUND

It is known to rotate circular cylindrical bodies that are conveyed in one direction about their vertical axis by means of a turning unit. In the beverage processing industry such a rotation may be necessary for different treatment steps of containers. These include, for example, cleaning the interior of the containers, guaranteeing that the cleaning medium can flow off, or labelling the container bottom.

In the prior art, so-called free-run-type tuners and shove-type turners are known. Free-run-type turners have a slope, so that the containers are rotated by the weight force in combination with contacting through the device. Shove-type turners have no slope and the containers are rotated due to the ram pressure of the subsequent containers.

DE 20 2011 005 686 U1 discloses a turner in which four interconnected elements having openings for the path of movement are provided, each of the four elements being cuboid-shaped and having respective openings formed therein, where each of the four elements extends over the entire length of the path of movement parallel to the direction of movement, and where two respective elements adjoin one another with surfaces arranged parallel to the direction of movement of the containers. Each of the components defines on its side facing away from the edge the contour of the channel that allows turning, rotation or some other change of position of the container during the conveying process parallel to the edges. At the transition points of the elements, butt joints are formed, which may interfere with the flow of containers and cause damage to the containers.

EP 0 070 195 A2 discloses a turning device consisting of approximately 50 to 70 plates arranged parallel to one another. Each of these plates has in its central area an opening having a specific shape. The shape differs slightly from one plate to the next. A can that enters the first plate at a certain position meets an opening that corresponds substantially to the shape of the can. In the next plate, the opening is again adapted to the shape of the can, but with a certain inclination. This continues in the third plate. After having passed through all 50 to 70 plates, the can will have been rotated by 180° or some other predetermined angle. Here, a large number of butt joints interfere with the flow of containers and may cause damage to the containers.

DE 2 301 524 discloses a device for conveying objects with a cage-like guide including a number of parallel rails attached to frame elements at intervals along the path of the objects. A portion of the cage-like guide can here be rotated about the axis of the transport path of the containers, so that the containers entering the guide section on one side in an upright position will be rotated from their vertical orientation while passing through this guide section and will exit on the other side of the guide section in a tilted position. The device consists of a large number of individual parts and movable components, and this may cause hygiene problems in the event of contamination, since cleaning is only possible to a limited extent.

U.S. Pat. No. 4,479,574 discloses a container transport apparatus with a substantially rectangular frame structure and flat guide structures extending upwardly from the frame structure, the lower parts of these guide structures being rigidly connected to the frame structure. Each of the guide structures has a centrally located aperture sized and shaped to receive therein the containers. The container guide means include an input twist portion, an intermediate portion located adjacent thereto and an output twist portion located adjacent to the intermediate portion.

A turner according to the prior art is normally manufactured to customer specifications and is expensive due to the small batch size (usually a batch size of one). During production, multi-axis tools must often be used for machining undercuts, by way of example. The shaping of the guides (e.g. the bending of bars) of turners necessitates high manual effort to this day. In addition, it takes a great deal of time and effort to ensure the necessary close manufacturing tolerances.

BRIEF DESCRIPTION OF THE DRAWINGS

Embodiments of the present disclosure are illustrated by way of example, and not by way of limitation, in the figures of the accompanying drawings.

FIG. 5 illustrates a perspective view of the device (closed variant) with reception means for wear strips and with a media-carrying channel in the lower area of the device, according to certain embodiments.

DETAILED DESCRIPTION

Figure 1:
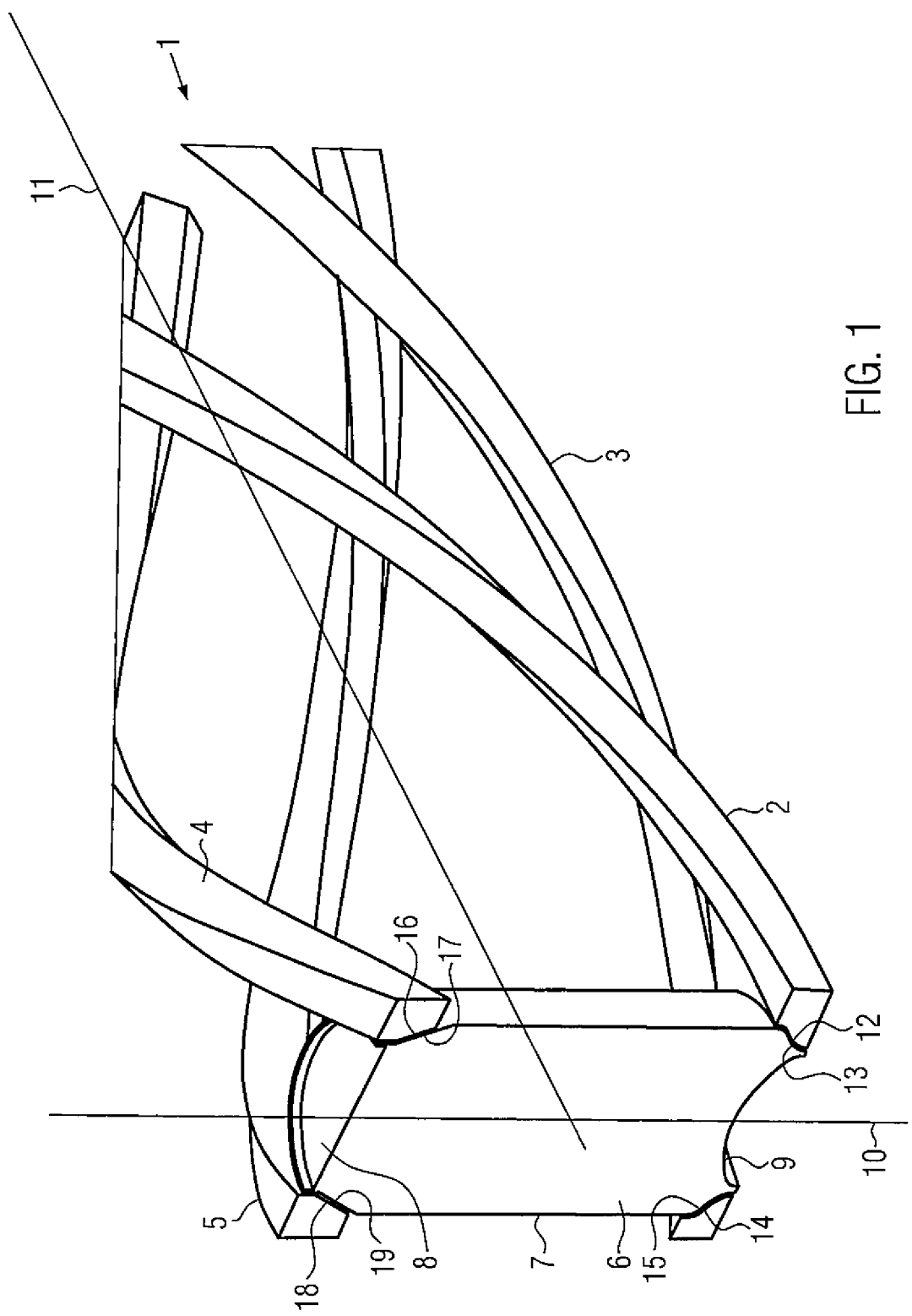
FIG. 1 illustrates a device for guiding and pivoting circular cylindrical bodies with guide rods, according to certain embodiments.

The present disclosure may provide one or more of a device, system, or treatment line for guiding and pivoting bodies, which take into account customer-specific demands and can be produced at a reasonable price.

A device for guiding and pivoting bodies, such as cans, bottles, preforms, bottle closures, cardboard containers (e.g., cardboard packages coated on the inside, such as Tetra Pak™) or flasks, in the case of which the guiding and pivoting of the bodies takes place by sliding the bodies on the device, is produced by using a generative production method.

The term "generative manufacturing method," also known as additive manufacturing, is used comprehensively for the methods which have usually been referred to as rapid prototyping up to now and which are used for a rapid and cost-effective production of models, samples, prototypes, tools and end products. In a generative manufacturing method, one or more objects are produced directly on the basis of computer-internal data models (usually transferred via the STL interface) from shapeless (liquids, powders and the like) or neutrally shaped (strip-shaped, wire-shaped) material making use of chemical and/or physical processes. Although these are primary shaping processes, the manufacturing of a specific object via generative manufacturing may not require special tools, such as molds, in which the geometry of the respective object to be produced is inherent or in which the geometry of the object to be produced is stored.

Generative manufacturing allows an integration of connection components and functions as well as the reduction of the number of individual parts in comparison with conventional manufacturing methods. Undercuts can be manufactured easily and reliably by means of a generative manufacturing method. Also the manufacturing of a small number of pieces of a device according to embodiments of the present disclosure is less expensive. In addition, generative manufacturing incurs almost no waste. The device can also be adapted precisely to the customer's object (body), e.g. by object scanning, so that time-consuming and costly reworking with respect to the necessary tolerances will no longer be necessary.

For the generative manufacturing method, three-dimensional (3D) printing using a powder bed process (e.g. selective laser melting/sintering (SLM/SLS), selective head sintering (SHS), binder jetting, electron beam melting (EBM)), solid free-form fabrication (e.g. fused deposition modeling (FDM), laminated object modeling (LOM), build-up welding and/or cladding, wax deposition modeling (WDM), contour crafting, gas dynamic cold spraying, electron beam welding (EBW)), liquid material processes (e.g. stereolithography (SLA), micro-SLA, digital light processing (DLP), liquid composite molding (LCM)) or hybrid processes (e.g. metal powder application (MPA) process of the firm of Hermle, laser beam deposition welding with integrated milling) may be carried out.

The device may include at least one plastic or at least one metal or a mixture of at least one plastic and at least one metal. The plastics used may e.g. be polyamide 12 (PA12), polyethylene 1 (PE1), polyether ether ketone (PEEK), polyamide (PA), ultra-high-molecular-weight polyethylene (UHMW-PE), steel-net reinforced plastics or plastics having solids, e.g. glass, added thereto. The metals used may e.g. be 1.4404, aluminum, titanium or other commercially available metal powders that are suitable for generative manufacturing. The device may be configured as a hybrid component, with one part of the device being produced in a conventional manner making use of an injection molding process and another part of the device being produced by means of generative manufacturing.

According to a first embodiment, the device may be configured such that, cooperating with the bodies, it contacts these bodies in a form fit manner in at least three surface areas for guiding and pivoting. For such contacting, guide rods may be provided, which are configured to support continuous pivoting of the body about its longitudinal axis, while the body is moving in the device in the conveying direction. In order to be able to guide and pivot the body, each of the guide rods may form a smooth curve in three-dimensional space. The movement in the conveying direction may be caused in a free-run-type tuner by the weight force acting on the bodies or in a shove-type turner due to the ram pressure of subsequent bodies.

In some embodiments, the device may contact a can on the surface of the can in a form fit manner in four surface areas with a respective one of the guide rod areas of one of the four guide rods. Contacting may take place at the inclined transition from the circumferential surface to the lid surface and the bottom surface, respectively (also referred to as such in cases where the lid surface and the bottom surface do not yet include a lid or a bottom). The individual guide rods are spaced apart at a constant transverse distance, which is predetermined by one or more dimensions of the can, such as height and diameter. The curvature, i.e. the profile of the smooth curve in three-dimensional space, and the length of the guide rods result from the desired pivoting angle and a distance which may possibly have to be bridged, e.g. a distance to a subsequent conveyor.

The lateral surface of a guide rod, along which contact to the surface area of the can takes place while the can is being conveyed, may correspond to the negative shape of this surface area of the can. This form-fit contacting allows the can to be reliably guided along the conveying direction by means of the guide rods, while the can is being pivoted. The can will therefore not slip unintentionally relative to the guide rods, so that smooth and continuous pivoting will be possible.

In some embodiments, the device may be configured such that, cooperating with the bodies, it will contact the latter substantially with its entire surface for the purpose of guiding and pivoting. The device may include in its interior a path of movement with a cross-section that is adapted to the shape of the body, since the device contacts the body substantially along the entire longitudinal-section circumference of the body. The direction of movement of the body may be substantially perpendicular to the cross-section. The "entire surface" used for guiding the body may thus be regarded as being substantially the surface by which the cross-section of the path of movement is delimited in three-dimensional space.

Through a continuous displacement (e.g., a rotation) of the cross-sectional area in the direction of movement, the path of movement causes forced pivoting and guiding of the body conveyed in the direction of movement.

The device may be configured such that, cooperating with the bodies, it substantially defines a closed surface relative to the bodies.

The device may have openings of a predetermined size on the underside. The predetermined size of the openings may be smaller than a diameter of a circular cylindrical body or smaller than a minimum dimension of a body of arbitrary shape, so that the bodies will be prevented from partially slipping into the openings when they are being guided and pivoted, since this may result in damage to the bodies and/or in bodies that get stuck in the device. The openings may here be provided along the entire device and the device may thus be provided with a continuous opening facing downwards.

By means of the openings, liquid medium can be fed from the outside or discharged to the outside. The openings may, however, also be provided for releasing bodies jammed in the device; e.g. by inserting a tool into one of the openings.

A bottom surface of the device may be defined by at least one conveyor belt, which is configured to feed and/or discharge the bodies. The conveyor belts can actively support the transport of the bodies through the device.

The device may include fastenings for fixing to other conveyor units, the fastenings being adapted to be attached to the device by means of the generative manufacturing method. The fastenings, such as eyelets, hooks, pins, may be provided for fixing the device to a body-feeding conveyor belt and/or a body-discharging conveyor belt or its frame.

The device may include at least one wear strip. The at least one wear strip may be fixed in a shaped groove in a form fit manner. The at least one wear strip may include UHMW-PE with glass components. The outer surface of the device may be, sectionwise, provided with openings for pulling in the at least one wear strip. The device may include at least one fixing (e.g., fastening, fastener), which is configured to prevent the at least one wear strip from slipping out in the conveying direction. By means of the at least one wear strip, wear phenomena of the device can be reduced and the bodies can also be conveyed more easily. Furthermore, substantially constant and reproducible conditions for the conveyance of the bodies may be provided (e.g., are guaranteed). The at least one wear strip may here be flat, i.e. band-like, or also cord- or rope-like. The material used for the band or rope of the at least one wear strip may be is friction-reducing. An advantage of cord- or rope-like wear strips in comparison with band-like wear strips is that the cord- or rope-like wear strips can be inserted more easily, since they tilt less easily when the cord- or rope like wear strips are pulled in. Alternatively or in addition to a wear strip, it is also imaginable to use brush guides.

The device may include a blow-off unit, which is configured to allow product residues to be removed from the outer surface of the bodies, ducts for a blow-off medium may be formed separately and following the course of the device or ducts for a blow-off medium being integrated in the body-carrying parts of the device. By blowing-off the product residues, an introduction of excessive amounts of product residues into the device as well as into subsequent devices can be avoided, which product residues might then cause problems during the guiding and pivoting of the bodies and during their further treatment. Analogously, also process-related condensation water or liquid remaining on the outer surface of the bodies after pasteurization may be blown off.

The device may include channels for feeding a friction-reducing medium. The ducts for the friction-reducing medium may be configured separately and following the course of the device or the ducts for the friction-reducing medium may be integrated in the body-carrying parts of the device. The friction-reducing medium can reduce wear phenomena of the devices and facilitate the conveyance of the bodies.

The device may include channels for supplying a gas, such as air, and the device may be equipped with openings for directing a flow of gas. The openings may be in the form of lamellas, e.g. in the form of gills. The device may also be manufactured in such a way that the channels and thus the escaping gas are directed obliquely, i.e. at an angle, in the conveying direction and a deflection of the gas through lamellas can be dispensed with. The formation of an air cushion between the body surface and the surface of the device supports the conveyance of the bodies. The effect produced by the flow of gas can support the conveyance of the bodies still further.

The device may include a cleaning unit in the form of at least one nozzle arranged below a path of movement of the bodies and configured to clean the bodies. The at least one nozzle may be adapted to have a cleaning medium applied thereto. The at least one nozzle may be arranged in an area where, through a cooperation between the device and the bodies, the openings of these bodies face downwards. The term nozzle as described herein includes a small opening (hole) or a plurality of small openings (holes) in a medium-carrying tube, which is/are configured to allow the pressurized cleaning medium to escape.

The device may have integrated therein electronics, such as non-contact sensors (e.g. Hall sensors or ultrasonic sensors), optical detection devices (e.g. cameras or light barriers), or radio-frequency identification (RFID) tags, the electronics being integrated by means of the generative manufacturing method (similar to the well-known potting of components) or the electronics being configured as modular interchangeable elements. By means of the integrated electronics, it is possible to track the movement of the bodies in the device or to carry out inspection tasks. The RFID tags allow the device to be unequivocally identified and the RFID tags can provide both the manufacturer and the customer with information on product piracy. Due to the modular interchangeability, individual elements of the electronics can easily be removed and replaced in the event of malfunction. Due to the integration by means of the generative manufacturing method, the device can be protected against disturbing influences, such as cleaning media.

According to an embodiment, the device may include openings, which are configured to accommodate conventional electronic components. Such an opening may be a hole for a camera. Such an opening (e.g., responsive to using certain materials) may also be sealed immediately in the course of the generative manufacturing process.

The device may include tolerance compensating means, such as resilient portions. In some embodiments, the tolerance compensating means are of a pneumatic, mechanical or hydraulic nature. In some embodiments, the tolerance compensating means are made of a material other than the material of the device. The tolerance compensating means allow guiding and pivoting of bodies that have slightly different dimensions due to their manufacturing process and/or due to wear and tear. The use of tolerance compensating means may be advantageous, if two users use similarly dimensioned bodies in their process lines. In this case, two identical devices can be produced by means of the generative production method and differently dimensioned tolerance compensating means can be introduced in the devices, so that the first user will be able to use cans with a height of 110 mm and an outside diameter of 53 mm in his device and the second user will be able to use cans with a height of 110 mm and an outside diameter of 58 mm in his device. The differently dimensioned tolerance compensating means may be wear strips of different widths and/or thicknesses.

The device may be adapted to have applied thereto cleaning agents, such as a disinfecting cleaning agent or water under high pressure, the cleaning agent may be supplied through a plurality of channels and openings to ensure a predetermined wetting of the device. In this way, it is possible to clean or disinfect the device according to existing hygiene regulations without having to disassemble the device.

The device may be arranged on a basic body. The basic body may include (e.g., consist of) recycled plastic ("regrind") or of some other inexpensive and suitable material. In some embodiments, the weight ratio of the device to the basic body is greater than 50%. In some embodiments, the weight ratio of the device to the basic body is greater than 25%. In some embodiments, the weight ratio of the device to the basic body is greater than 10%. The use of a basic body allows (e.g., ensures) the stability of the device, it can facilitate the positioning of the device within a process line (e.g. standardization of fasteners) and it allows an even faster and more cost-effective production of the device.

The device may be composed of a plurality of modules, the modules being joined together by screwing, gluing, welding or by a generative method. Due to the boundary conditions of generative manufacturing, a maximum size for the manufactured device may be given. When the device is composed of a plurality of modules, the size of the entire device can be increased. Joining the modules together by means of a generative method allows a transition without butt joints. Otherwise, a maximum of one butt joint will be created, e.g. when two devices of the closed variant are joined together.

Furthermore, the present disclosure includes a system, including at least two devices for guiding and pivoting bodies, as described above or hereinafter, the at least two devices being arranged in parallel. The system may further include a conveyor device and a control device configured to control the conveyor device according to a control command and to thus feed bodies selectively to at least one of the two devices. Depending on the respective body, e.g. two types of bodies with different diameters, this system allows a body to be fed to a suitable device for guiding and pivoting the body, so that the type of body will match the dimensions of the device. The parallel arrangement of the at least two devices means that these devices are not arranged in succession in a process path.

In order to allow the bodies to be selectively fed to one of the at least two devices, the conveyor device may have different structural designs.

According to a first embodiment, the conveyor device includes a switch for redirecting a conveying path of a body. The body is redirected by means of the switch and is fed to the device associated therewith.

According to another embodiment of the system, the conveyor device may be configured to move the at least two devices horizontally. The conveying path of the body thus remains unchanged and the device is moved into this conveying path.

According to a further embodiment of the system, the at least two devices can be rotated vertically about a common axis similar to the cylinder of a revolver, so that the respective device required can be introduced into the conveying path of the bodies.

The present disclosure additionally relates to a treatment line for polyethylene terephthalate (PET) containers, including a process path, a preform storage unit, a preform oven of a stretch blow-molding machine, and a device of the type described above or hereinafter, the device being arranged in the process path between the preform storage unit and the preform oven.

In addition, the present disclosure relates to a treatment line for PET containers, including a process path, a container closure storage unit, a closing unit for closing PET containers with the container closures, and a device of the type described above or hereinafter, the device being arranged in the process path between the container closure storage unit and the closing unit.

In other treatment lines, a device of the type described above or hereinafter may be arranged
  upstream of a filler for filling the bodies with a product,
  downstream of a filler for filling the bodies with a product,
  downstream of a closing unit for closing the bodies,
  downstream of a rinser for removing product residues, or
  upstream or downstream of a dating station for applying product-specific information to the bodies.

FIG. 1 shows a first embodiment of a device 1 for guiding and pivoting circular cylindrical bodies 6. Exemplarily, a can 6 is here shown as a circular cylindrical body 6. The device 1 may include the four guide rods 2, 3, 4, 5 shown, which are configured to support continuous pivoting of the can 6 about its longitudinal axis 10, while the can 6 is moving in the conveying direction 11 in the device 1. The device 1 contacts the can 6 on the surface of the latter in a form fit manner in four surface areas 13, 15, 17, 19 with a respective one of the guide rod areas 12, 14, 16, 18 of one of the four guide rods 2-5. In the illustration shown, contacting takes place at the inclined transition from the circumferential surface 7 to the lid surface 8 and the bottom surface 9, respectively, (also referred to as such in cases where the lid surface 8 and the bottom surface 9 do not yet include a lid or a bottom).

In order to be able to pivot the can 6, each of the guide rods 2-5 defines a smooth curve in three-dimensional space, with the individual guide rods 2-5 being spaced apart at a constant transverse distance. This transverse distance is determined by the dimension of the can 6, such as height and diameter. The curvature and the length of the guide rods 2-5 result from the desired pivoting angle.

The lateral surface of a guide rod 2-5, along which contact to the surface area of the can 6 takes place while the can 6 is being conveyed, corresponds to the negative shape of this surface area of the can 6. This form-fit contacting allows the can 6 to be reliably guided along the conveying direction 11 by means of the guide rods 2-5, while the can 6 is being pivoted. The can 6 will therefore not slip unintentionally relative to the guide rods 2-5, so that smooth and continuous pivoting will be possible.

The guide rods 2-5 may be attached to frame elements, which are not shown, or to a basic body that is not shown. In addition, other guide rods may be provided (not shown), which contact the can on the circumferential surface, the bottom surface and/or the lid surface.

Figure 2:
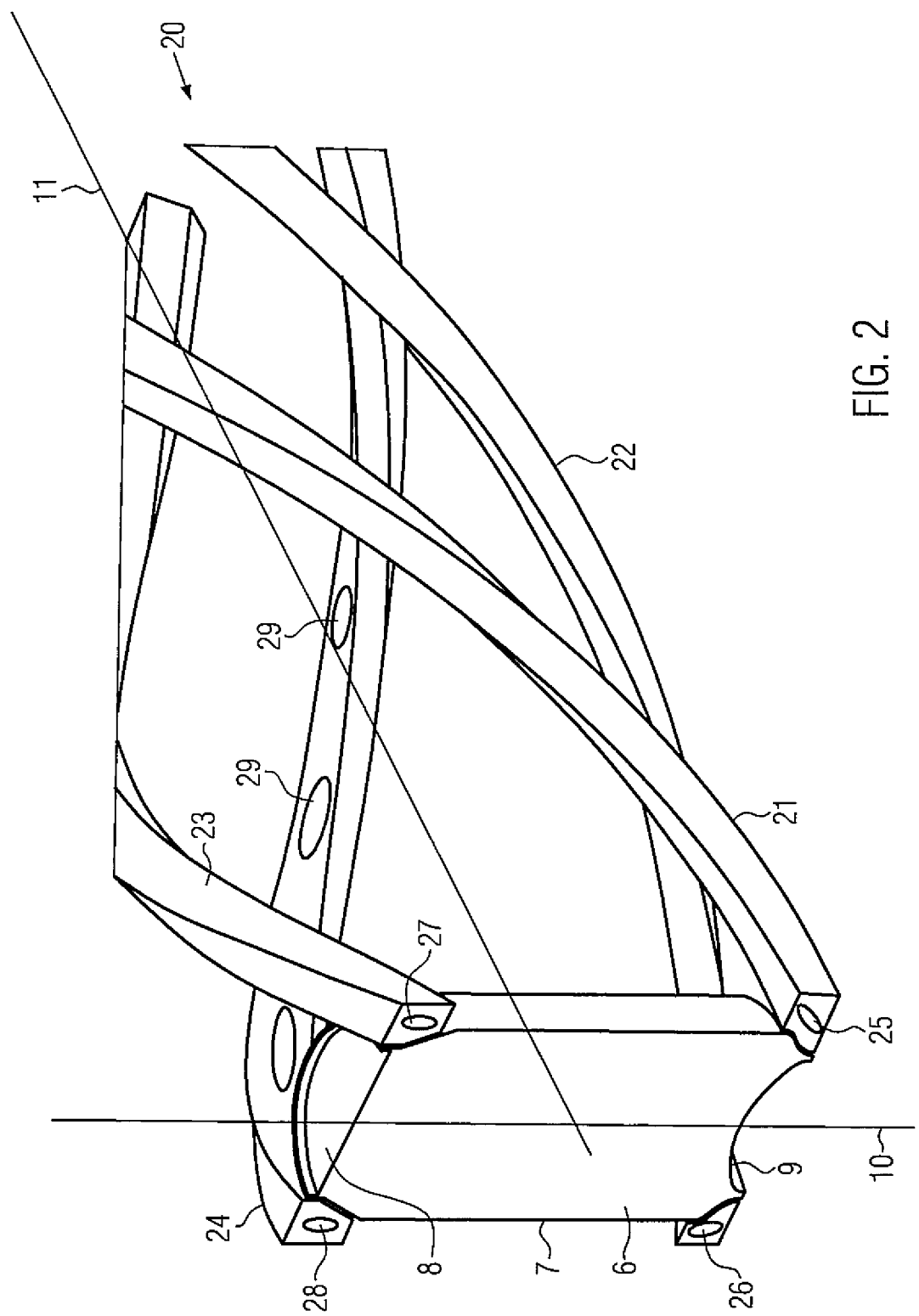
FIG. 2 illustrates a device for guiding and pivoting circular cylindrical bodies with guide rods provided with channels and openings, according to certain embodiments.

FIG. 2 shows a second embodiment of the device 20, which is similar to device 1 of FIG. 1 (e.g., essentially corresponds to that of FIG. 1). In FIG. 2, the guide rods 21, 22, 23, 24 are provided with channels 25, 26, 27, 28 in their interior. In FIG. 2, the lateral surfaces of the guide rods 21-24, along which contact with the surface area of the can 6 takes place while the can 6 is being conveyed, have openings 29. The channels 25-28 can be used for transporting various media, and these media can exit through the openings 29.

The medium provided may e.g. be air, whereby a kind of air cushion is formed between the contacted surface area of the can 6 and the lateral surfaces of the guide rods 21-24, said air cushion supporting and facilitating the guiding and the pivoting of the can 6.

In addition, a cleaning agent/disinfectant may be used as a medium, which means that cans 6 guided in the device 20 and/or the device 20 itself can be cleaned/disinfected.

Figure 3:
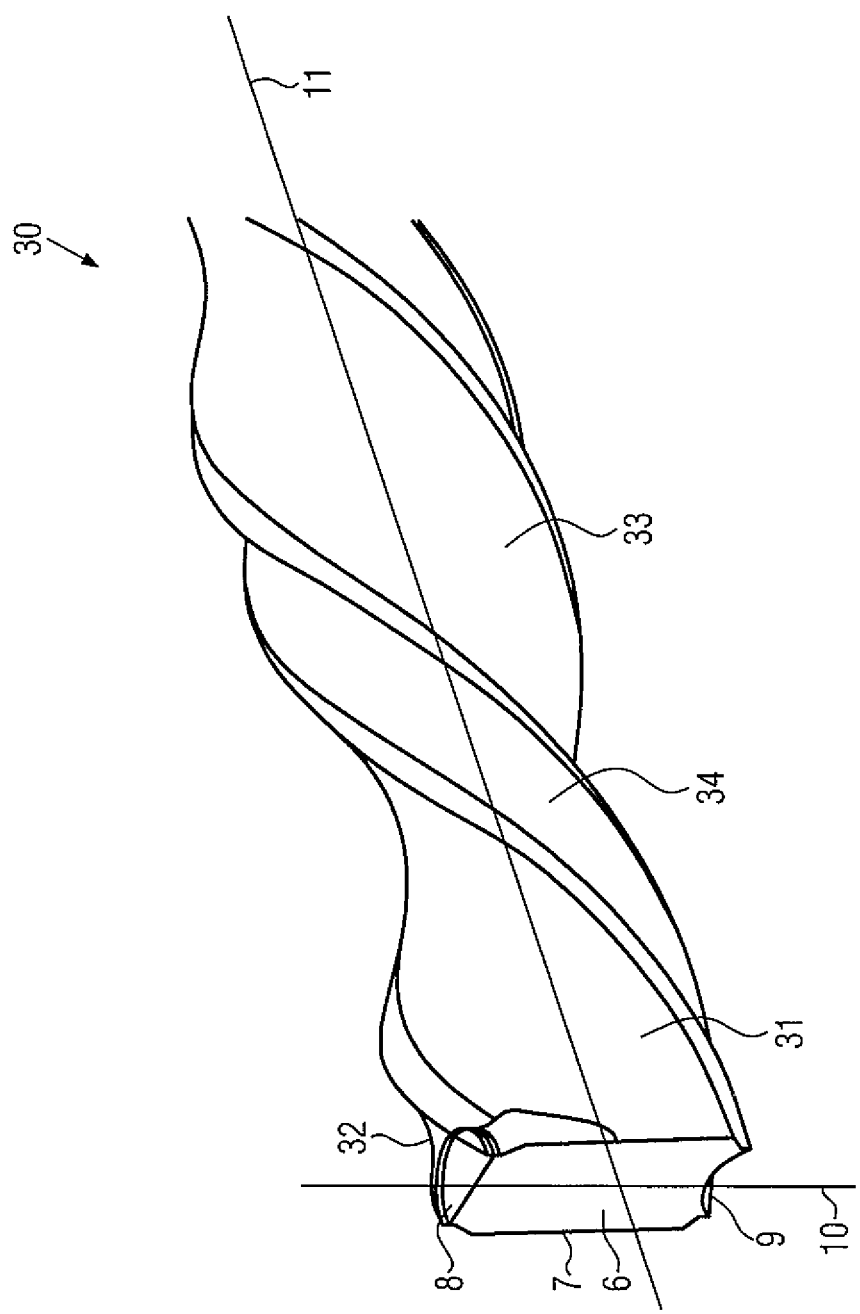
FIG. 3 illustrates the device (closed variant), according to certain embodiments.

FIG. 3 shows a third embodiment of the device 30 (closed variant). In FIG. 3, the device may contact the can 6 along the entire longitudinal-section circumference of the can 6. The longitudinal section runs through and parallel to the longitudinal axis 10 and perpendicular to the conveying direction 11.

The device 30 includes in its interior a path of movement with a cross-section, the direction of movement of the can 6 being substantially perpendicular to the cross-section. The cross section is adapted to the shape of the can 6, since the device contacts the can 6 along the entire longitudinal-section circumference of the can 6. In FIG. 3, the four lateral surfaces 31, 32, 33, 34 of the device 30 essentially show the line of the cross-sectional shape inside the device 30. The lateral surfaces 31 and 33 contact the circumferential surface 7 of the can, the lateral surface 32 contacts the lid surface 8 and the lateral surface 34 contacts the bottom surface 9.

Through a continuous displacement (e.g., a rotation) of the cross-sectional area in the direction of movement, the path of movement causes forced pivoting and guiding of the can 6 conveyed in the direction of movement.

Due to the continuous displacement, the risk of damage being caused to the can 6, e.g. through knocks against internal structures of the device 30, is small.

Figure 4A:
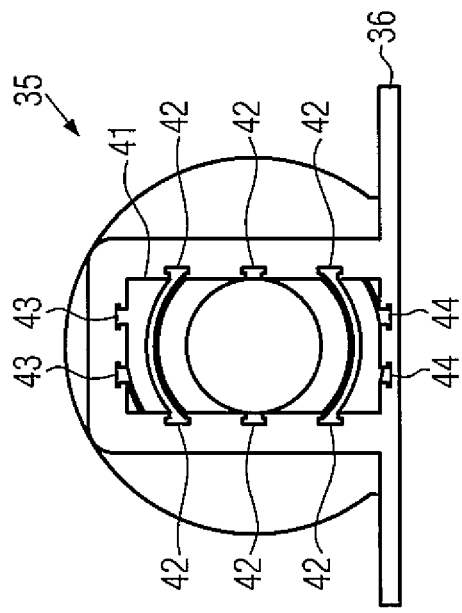
FIG. 4A illustrates a front view of the device (closed variant), according to certain embodiments.

FIG. 4A shows a front view of a fourth embodiment of the device 35 (closed variant), said device 35 being arranged on a base plate 36 and including in its interior 41 also reception means 42, 43, 44 for wear strips.

Figure 4B:
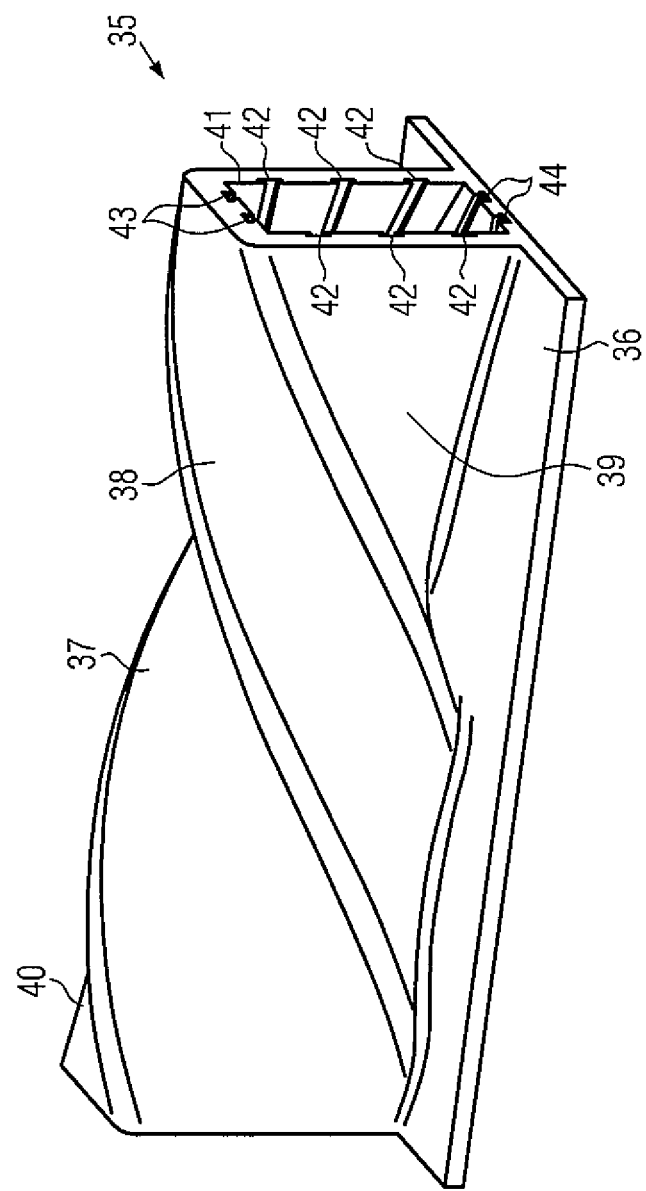
FIG. 4B illustrates a perspective view of the device according to FIG. 4A, according to certain embodiments.

FIG. 4B shows a perspective view of the fourth embodiment. The exact contour for guiding and pivoting the circular cylindrical bodies can be seen, the device being arranged on a flat base plate or on a flat basic body.

FIG. 5 shows a perspective view of a fifth embodiment of the device 45 (closed variant), reception means 47, 48, 49 for wear strips being here visible in the interior 46 of the device 45 and a media-carrying channel 50 being additionally arranged in the lower area of the device 45, so that bodies guided and pivoted in the device 45 or the device 45 as such can be cleaned by the medium.

Figure 6A:
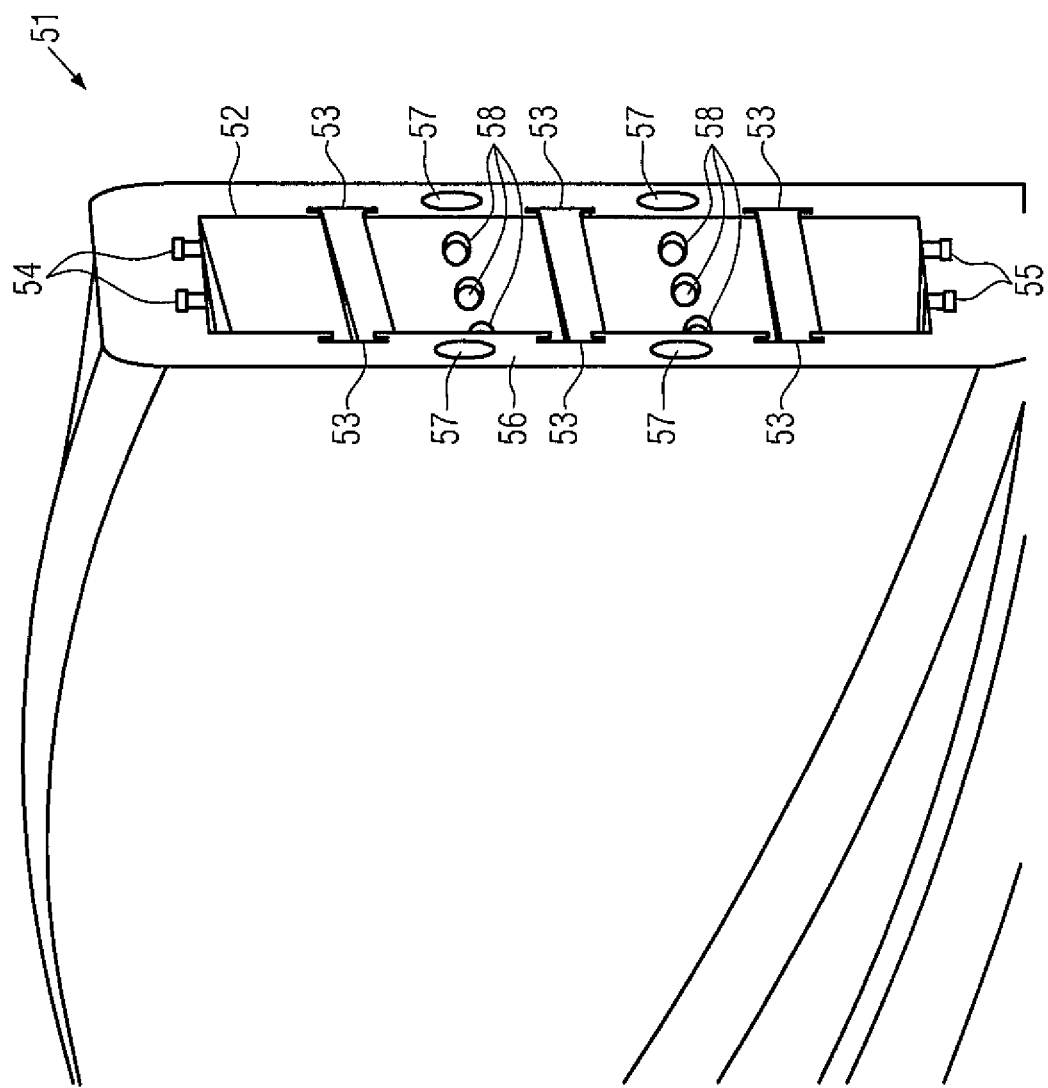
FIG. 6A illustrates a perspective view of the device (closed variant) with incorporated channels and outlet openings, according to certain embodiments.

FIG. 6A shows a perspective view of a sixth embodiment of the device 51 (closed variant), the device 51 including in the interior 52 thereof reception means 53, 54, 55 for wear strips and including channels 57 incorporated in its wall and a plurality of outlet openings 58, e.g. for air. In the embodiment shown, the outlet openings 58 are arranged on the inner sides of the two sidewalls. In addition, outlet openings 58 may be arranged such that, during an entire pivoting process, they will apply medium (e.g., always) to the same point of a container in the device 51. For example, for blowing out an interior space of a container (e.g. a preform) with air in order to remove foreign matter, the outlet openings 58 may be arranged in a bottom surface of the device 51 and, due to the shape of the device 51 for guiding and pivoting the container, the outlet openings 58 follow this shape, so that the outlet openings 58 will (e.g., always) be positioned opposite the mouth of the container.

Figure 6B:
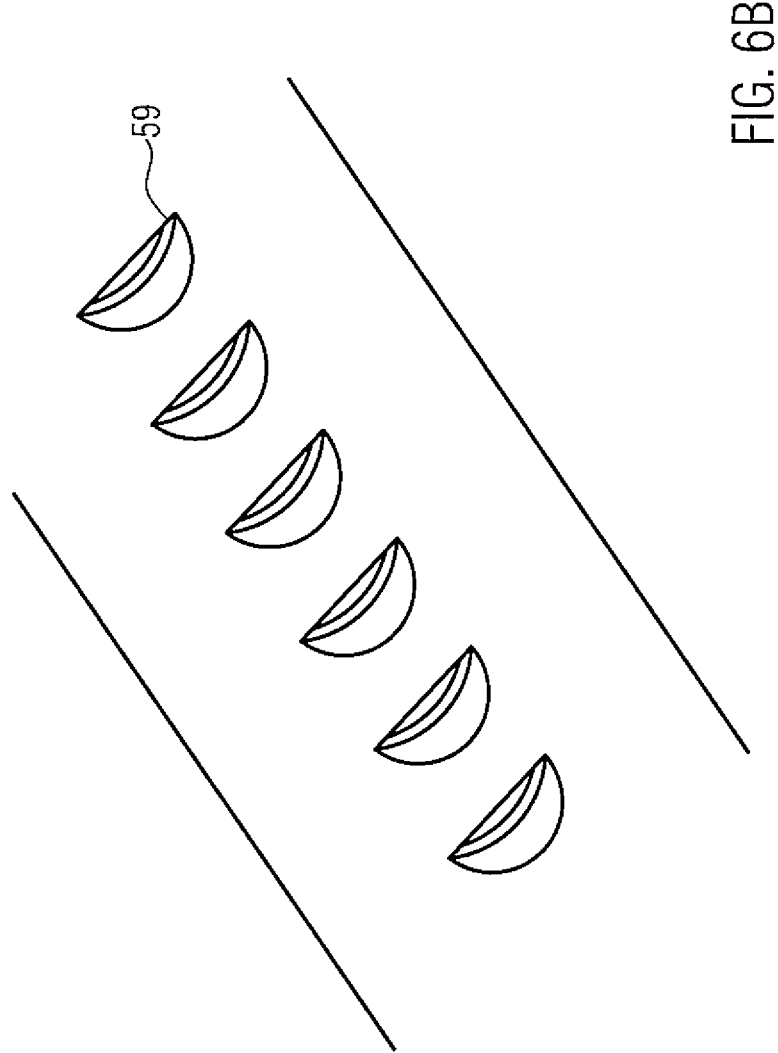
FIG. 6B illustrates gill-shaped outlet openings of the device according to FIG. 6A, according to certain embodiments.

As shown in FIG. 6B, the outlet openings may be gill-shaped 59; thus, an air flow can be controlled to flow in the conveying direction, and the movement and pivoting of the bodies can be supported in this way.

Figure 7:
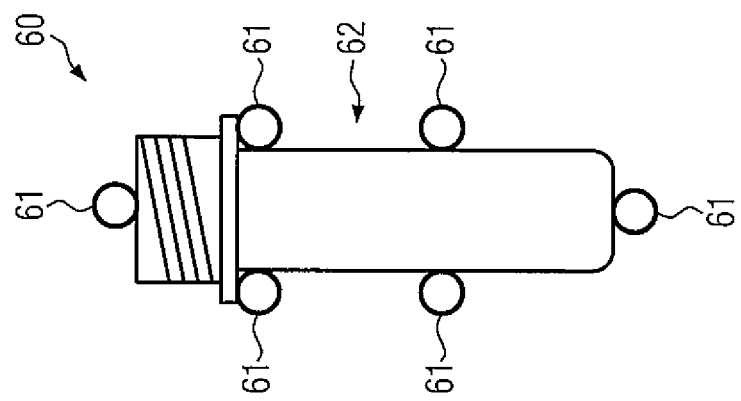
FIG. 7 illustrates the device with guide rods, being configured for circular cylindrical bodies, which have three cross-sections differing from one another in a step-shaped manner, according to certain embodiments.

FIG. 7 shows a seventh embodiment of the device 60 with guide rods 61, said device 60 being configured for circular cylindrical bodies 62, which have three cross-sections differing from one another in a step-shaped manner, e.g. for preforms.

Figure 8:
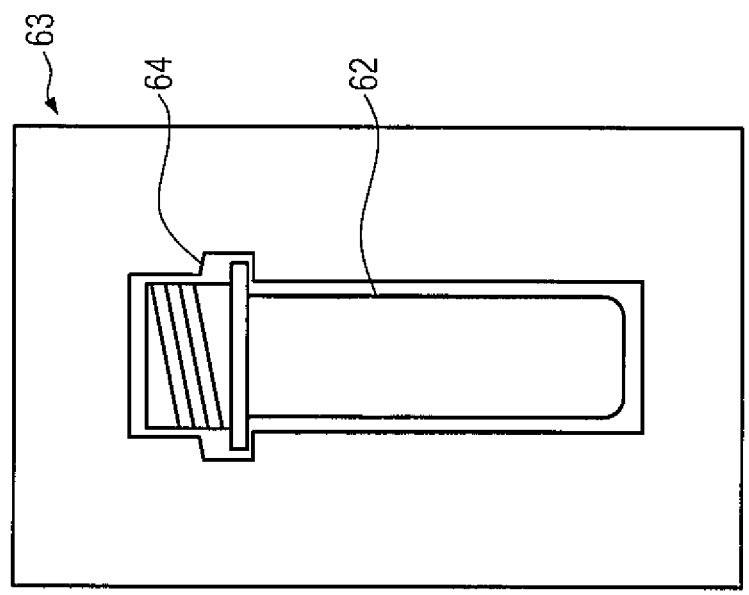
FIG. 8 illustrates the device (closed variant), which is configured for circular cylindrical bodies, which have three cross-sections differing from one another in a step-shaped manner, according to certain embodiments.

FIG. 8 shows an eighth embodiment of the device 63 (closed variant), which is configured for circular cylindrical bodies 62 (e.g. preforms), which have three cross-sections differing from one another in a step-shaped manner. The device 63 includes in its interior 64 a path of movement with a cross-section, the direction of movement of the body 62 being substantially perpendicular to the cross-section. The cross section is adapted to the shape of the body 62, since the device 63 contacts the body 62 substantially along the entire longitudinal-section circumference of the body 62.

Figure 9:
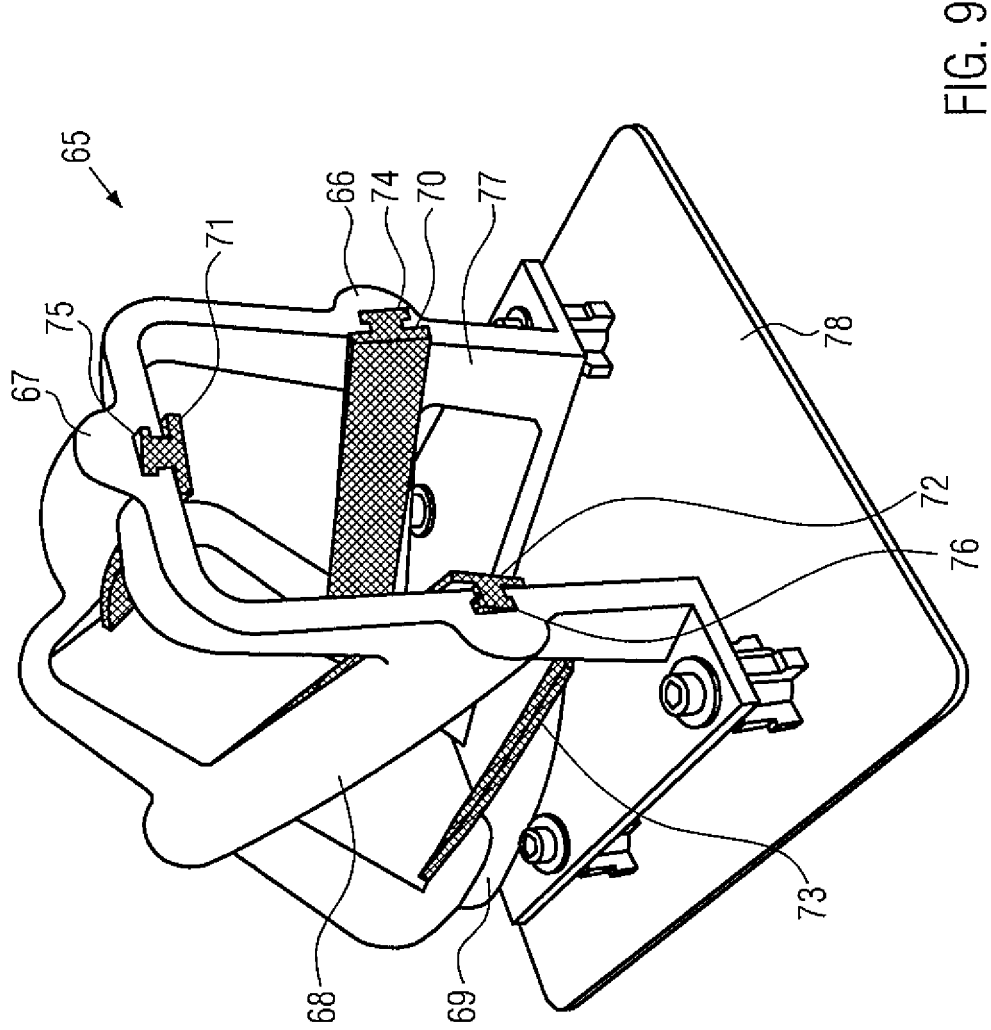
FIG. 9 illustrates the device (open variant) including guide rods that include wear strips, according to certain embodiments.

FIG. 9 shows a ninth embodiment of the device 65 (open variant), in the case of which the guide rods 66, 67, 68, 69 include flat wear strips 70, 71, 72, 73. The wear strips 70-72 are partly arranged in reception means 74, 75, 76 in the guide rods 66-68 provided for this purpose. The reception means of one of the guide rods 69 is not visible in FIG. 9. The guide rods 66-69 are attached to a support structure 77, which, in turn, is connected to a base plate 78.

It is to be understood that the above description is intended to be illustrative, and not restrictive. Many other embodiments will be apparent upon reading and understanding the above description. Although embodiments of the present disclosure have been described with reference to specific example embodiments, it will be recognized that the invention is not limited to the embodiments described, but can be practiced with modification and alteration within the spirit and scope of the appended claims. Accordingly, the specification and drawings are to be regarded in an illustrative sense rather than a restrictive sense. The scope of the invention should, therefore, be determined with reference to the appended claims, along with the full scope of equivalents to which such claims are entitled.

What is claimed is:

1. A device for guiding and pivoting bodies, wherein the device was produced using a generative manufacturing method:
    wherein the device comprises at least one wear strip, the at least one wear strip being fixed in a shaped groove of the device in a form fit manner;
    wherein the guiding and pivoting of the bodies comprises sliding the bodies on the at least one wear strip of the device; and
    wherein the bodies comprise at least one of cans, preforms, bottle closures, cardboard containers, or flasks.

2. The device of claim 1, wherein the device comprises at least one of a plastic, a metal, or a mixture of at least one plastic and at least one metal, and wherein the device is composed of a plurality of modules joined together by screwing, gluing, or welding.

3. The device of claim 1, wherein the device is configured to contact the bodies in a form fit manner in at least three surface areas for the guiding and the pivoting.

4. The device of claim 1, wherein the device is configured such that, cooperating with the bodies, the device contacts the bodies substantially with an entire interior surface of the device to achieve the guiding and the pivoting.

5. The device of claim 4, wherein the device is configured such that, cooperating with the bodies, it substantially defines a closed surface relative to the bodies for the guiding and the pivoting, wherein the closed surface comprises a wall with lateral sides.

6. The device of claim 4, wherein the device has openings of a predetermined size on an underside of the device.

7. The device of claim 6, wherein a liquid medium is to be at least one of fed into the device via the openings or discharged from the device via the openings.

8. The device of claim 4, wherein a bottom surface of the device is defined by at least one conveyor belt configured to at least one of feed or discharge the bodies.

9. The device of claim 1, wherein the device comprises fastenings to attach to other conveyor units, the fastenings are attached to the device via the generative manufacturing method.

10. The device of claim 1, wherein at least one of:
the at least one wear strip comprises ultra-high-molecular-weight polyethylene (UHMW-PE) with glass components;
an outer surface of the device is, sectionwise, provided with openings for inserting the at least one wear strip; or
the device comprises at least one fixing configured to prevent the at least one wear strip from slipping out in a conveying direction.

11. The device of claim 1, further comprising:
a blow-off unit configured to allow product residues to be removed from an outer surface of the bodies, wherein at least one of a) ducts for a blow-off medium are separately formed and follow a course of the device or b) ducts for the blow-off medium are integrated in body-carrying parts of the device.

12. The device of claim 1, further comprising channels for feeding a friction-reducing medium, wherein ducts for the friction-reducing medium are at least one of a) configured separately and follow a course of the device or b) integrated in parts of the device.

13. The device of claim 1, wherein the device comprises channels for supplying a gas, wherein the device is equipped with openings for directing a flow of the gas.

14. The device of claim 1, wherein the device comprises at least one nozzle arranged below a path of movement of the bodies and configured to clean the bodies, wherein at least one of a) the at least one nozzle is adapted to have a cleaning medium applied thereto or b) the at least one nozzle is arranged in an area where, through a cooperation between the device and the bodies, openings of the bodies face downwards.

15. The device of claim 1, wherein:
electronics are integrated in the device;
the electronics comprise one or more of non-contact sensors, optical detection devices, or radio-frequency identification (RF ID) tags; and
the electronics are integrated via the generative manufacturing method or the electronics are configured as modular interchangeable elements.

16. The device of claim 1 further comprising resilient portions for tolerance compensation, wherein the resilient portions are at least one of a) made of a material other than the material of the device or b) are pneumatic, mechanical, or hydraulic.

17. The device of claim 1, wherein the device is adapted to have a cleaning agent applied thereto, wherein the cleaning agent is to be applied to the device via a plurality of channels and openings in the device to provide a predetermined wetting of the device, and wherein the cleaning agent comprises at least one of a disinfecting cleaning agent or water under high pressure.

18. The device of claim 1, wherein the device is arranged on a basic body, wherein at least one of:
the basic body comprises recycled plastic; or
a weight ratio of the device to the basic body is greater than 10%.

19. The device of claim 1, wherein the device is composed of a plurality of modules joined together by the generative manufacturing method.

20. A method comprising:
identifying a digital model;
receiving material that is shapeless or neutrally shaped; and
producing, via generative manufacturing based on the digital model, a device by applying one or more chemical or physical processes to the material, wherein the device comprises at least one wear strip, the at least one wear strip being fixed in a shaped groove of the device in a form fit manner, wherein the device is configured to guide and pivot bodies, wherein guiding and pivoting of the bodies comprises sliding the bodies on the at least one wear strip of the device, and wherein the bodies comprise at least one of cans, preforms, bottle closures, cardboard containers, or flasks.

* * * * *